Feb. 29, 1944. K. MAHNKE 2,342,810
WINDLASS DEVICE
Filed Jan. 15, 1941 3 Sheets-Sheet 2

Fig. 3. Warping

Fig. 4. Wildcat Operation

WITNESSES:

INVENTOR
Kurt Mahnke.
BY
Paul E. Friedemann
ATTORNEY

Feb. 29, 1944.   K. MAHNKE   2,342,810
WINDLASS DEVICE
Filed Jan. 15, 1941   3 Sheets-Sheet 3
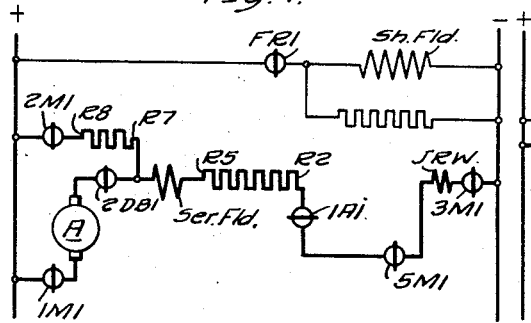
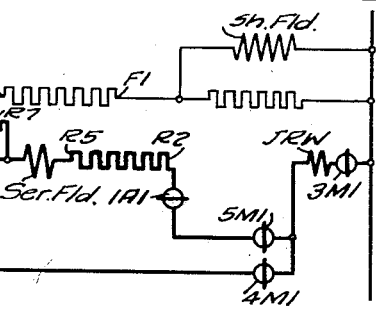
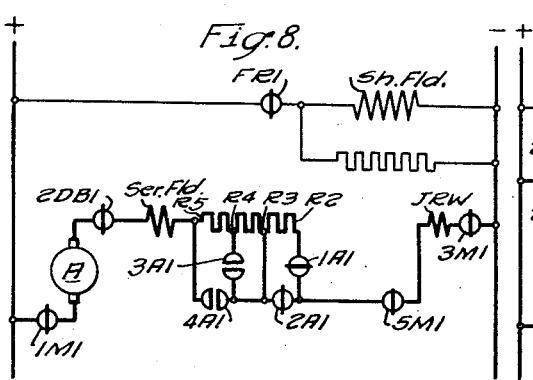
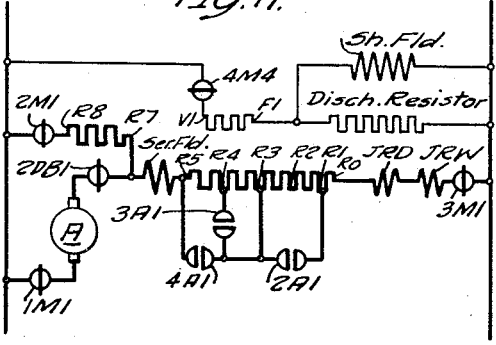
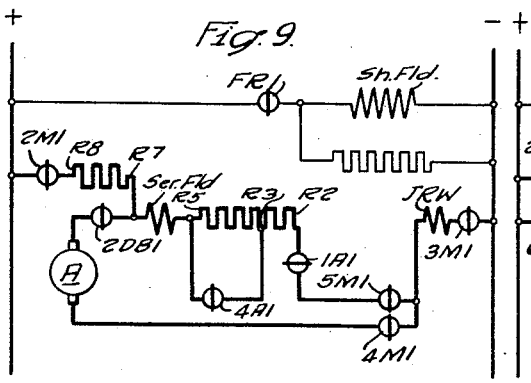
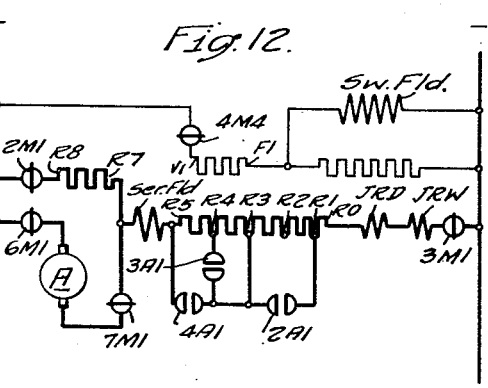
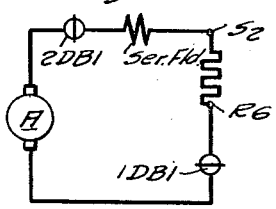
WITNESSES:
INVENTOR
Kurt Mahnke.
BY
Paul E. Friedemann
ATTORNEY Patented Feb. 29, 1944

2,342,810

UNITED STATES PATENT OFFICE 2,342,810

WINDLASS DEVICE

Kurt Mahnke, Wilkinsburg, Pa., assignor to Westinghouse Electric & Manufacturing Company, East Pittsburgh, Pa., a corporation of Pennsylvania Application January 15, 1941, Serial No. 374,502

11 Claims. (Cl. 254—173)

My invention relates to a windlass device such as used on board a ship, and is specifically directed to a selective control system which will give, to a single driving motor, either of two different sets of characteristics, depending upon whether the motor is to drive the windlass drum (or wildcat) or whether the motor is to drive a warping drum (more commonly known as the gypsy or niggerhead).

A more specific object of my invention is to provide a control system for a driving motor which includes a selector switch, which selector switch will automatically modify the sequence of the control system, depending upon the position of the locking head of the wildcat brake, or depending upon the position of the brake operating mechanism for the wildcat which will determine whether the windlass mechanism is set up for handling the anchor carrying chain (that is, for wildcat operation), or whether the windlass mechanism is set up for operating the warping hawser such as in cases where it is desired to haul the ship towards the shore.

Another object of my invention is to provide a control system for a windlass which will have dynamic braking lowering characteristics for wildcat operation, and which will have straight reversing characteristics of substantially symmetrical performance for warping operation.

Another object of my invention is to provide such aforesaid control system with a jamming relay which will have a selective rating depending upon whether the system is used for the warping operation or for the wildcat operation.

Other object and advantages will become more apparent from a study of the following specification when considered in conjunction with the accompanying drawings, in which:

Fig. 1A is a key representation of the relays embodied in Fig. 1—the relays in Fig. 1A are illustrated with their coils and contact members disposed in horizontal alignment with their positions in the straight line circuits of Fig. 1, so that their locations therein may be readily determined;

Fig. 3 shows speed-torque characteristics of the motor for each controller point during wildcat operation;

Fig. 4 shows speed-torque characteristics for each controller point during warping operation;

Figure 1:
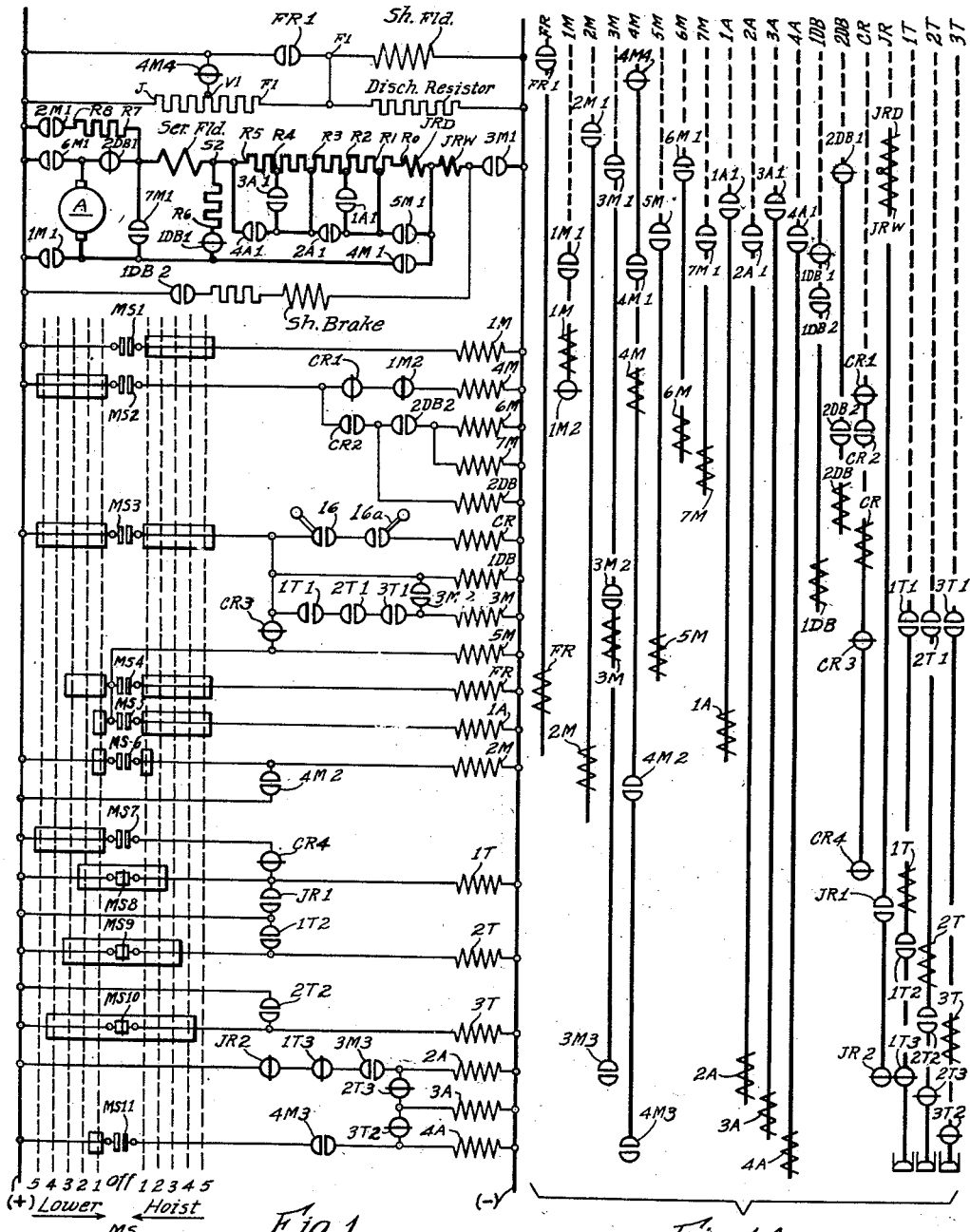
Figure 1 is a diagram in the straight line style of the control system for operating the windlass device shown in Figs. 5 and 6.
Figure 2:
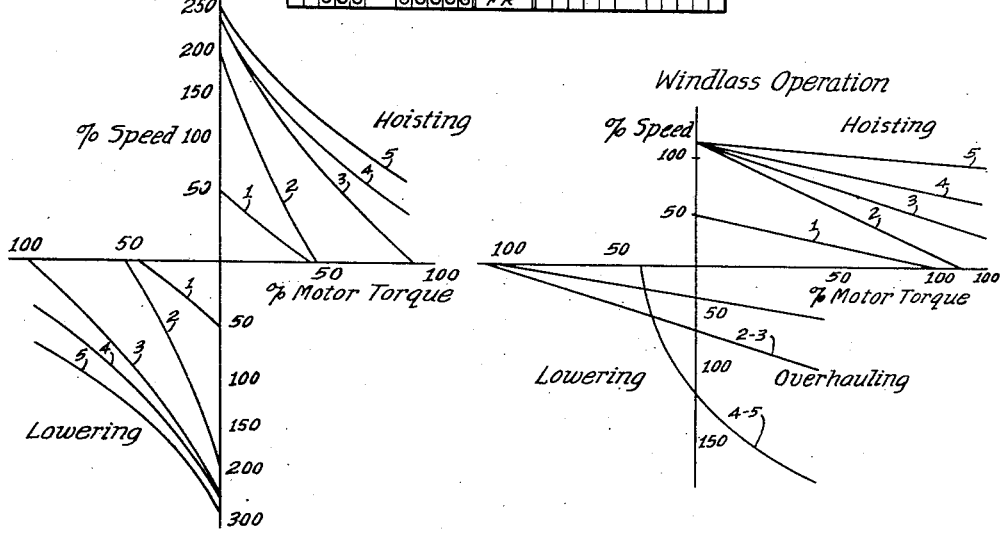
Fig. 2 is a chart showing the relative positions of the various contact members for the various positions of the master controller both for wildcat operation and for warping operation and in which the circles denote closed contacts.
Figure 6:
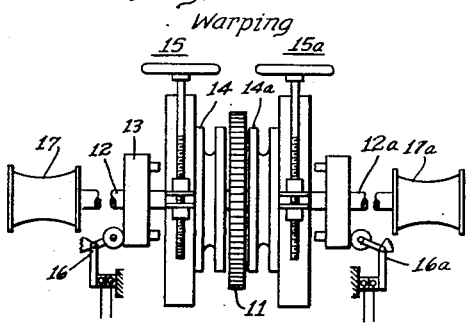

Fig. 6 shows the windlass mechanism including a pair of selector switches operable by the wildcat locking device and shows a relative arrangement of parts for promoting warping operation; and Figs. 7 through 13 show different circuit connections of the windlass motor of the control system represented in Fig. 1 as established with different adjustments of the above-mentioned selector switches and different adjustments of the master controller.

On board ships, the motor torques required for operating the wildcat, that is, the windlass drum, for winding partially therearound the chain which supports the anchor are too great for safely handling the warping hawser (the drum used to wind a rope therearound for pulling the ship towards shore or towards a fixed anchor). If the same torques for anchor handling were applied to the drum which winds the rope therearound for towing the ship towards shore (usually referred to as the gypsy, niggerhead or capstan head), these torques would break the hawser (or rope) in case it is pulled too tightly around the capstan head. Provision must be made, therefore, to limit the warping torques if the gypsy head is to be used for this purpose. While it might appear feasible to use a different drum geared to the gypsy giving reduced torques for this purpose, this has been found undesirable by ship personnel.

In the past, entirely separate and independent systems have been used, one for the warping operation and the other for wildcat operation. It has been thought heretofore impossible to provide a single motor and to give it entirely different characteristics, so that one set of characteristics would be useful for warping and the other set of characteristics useful for wildcat operation.

In accordance with my invention, I have provided a control system with a pair of selector switches, which switches when in one position will modify the control system and give it a sequence which will furnish speed-torque characteristics suitable for anchor handling (or wildcat operation), and when the selector switches are in a different position will modify the circuit so that the various points of the master controller will provide speed-torque characteristics suitable for warping operation.

For a better understanding of my invention it will be described broadly at first and then specifically, as will appear hereinafter.

Figure 5:
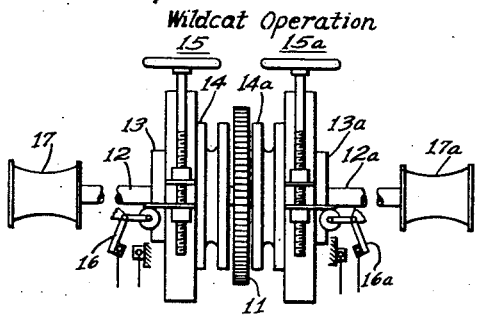
Fig. 5 shows a windlass device including a pair of selector switches which are operable by the brake operating mechanism and showing the relative arrangement of parts for promoting wildcat operation.

Broadly stated, my invention involves the mounting of selector switches, denoted by 16 and 16a in Figs. 1, 4 and 5, so that they may be operable either by the locking device of the wildcat or by the operating mechanism of the wildcat brake, or, in fact, by any mechanical arrangement which will indicate what particular operation the windlass device is arranged to perform. Obviously, if both the wildcat brakes are set, the device is not set up for lowering of the anchor until at least one of the wildcat brakes is released, or if the wildcat locking device locks at least one of the wildcat drums to the windlass drive shaft, then the device is obviously not set up for warping operation, but is set up solely for anchor handling.

Under control of the selector switches, the motor control circuit is arranged to have either of two sets of operating characteristics, one for wildcat operation and the other for warping operation.

The windlass motor, whose armature is denoted by A in Fig. 1 is provided with a series field (Ser. Fld.) and a shunt field (Sh. Fld.) and contains a dynamic braking resistor ($S_2$—$R_6$) in its armature circuit. The motor circuit includes also a group of series-connected resistors ($R_0$—$R_1$—$R_2$—$R_3$—$R_4$—$R_5$) for selective connection with the shunt field. Reference characters JRD and JRW in the upper portion of Fig. 1 represent the coils of a jamming relay.

For wildcat operation, the hoisting circuit for master switch positions 2 to 5 (Fig. 1) will give the motor a compound characteristic with the armature series resistor gradually being shorted. In position 1, armature shunting resistors decrease the speed of the motor, while the entire armature series resistor is in the circuit.

When lowering at wildcat operation, a dynamic braking circuit through the series field is provided on all positions. In the first position, the resistance in this circuit is lower than in the other positions, and in the fourth and fifth positions, the shunt field is weakened. Armature series resistance is in the circuit on all positions.

For warping operation, the weakened shunt field and armature series resistors limit the motor torques on all positions, and at the same time give a high light line speed. On all positions, operation in both directions is identical. Master switch controller points 3 and 4 provide for inserting all of the armature series resistance in the circuit, while on point 5, the first resistor step is shorted. The first point effects shunting of the armature.

The jamming or step-back relay is somewhat in the nature of an overload relay, but as distinguished from an overload relay, it merely provides for changing the speed-torque curve from one resistance value to one or another resistance value, so as to limit the torque in the event of the development of excess current, instead of completely stopping the motor, which would be undesirable in the case of anchor handling, for example. Such jamming relay is of selective rating, inasmuch as it is composed of a plurality of turns (JRD and JRW), only a part of which (JRW) will be effective in the circuit for wildcat operation so as to allow a greater latitude of overload than for warping operation. For warping operation, excessive torques must be restricted so as not to exceed the safe value for the warping hawser, above which danger of breaking would occur. In the past, the skill of the personnel was depended upon to handle the hawser in such a manner that it would not break.

The motor is held by a brake whenever the master switch is in the "off" position. This brake is electrically released by connecting its coil SH directly or in combination with resistance (as shown) to the full voltage of the line whenever the master switch is moved from the "off" position. The purpose of contactor IDB2 is to disconnect SH from the line when the master switch is in the "off" position.

Referring more particularly to Figs. 5 and 6, the numeral 11 denotes a gear which is mechanically coupled to the windlass shaft 12—12a, which gear is driven by a driving motor (not shown). Slidably splined to the windlass shaft 12—12a is a pair of locking heads or clutches 13 and 13a which have teeth adapted to intercept into corresponding recesses formed in the wildcats 14 and 14a, respectively. The wildcats 14 and 14a, as well known, have sprockets thereon for accommodating the chains which are respectively connected to the two anchors. The wildcats may be held in place by brakes 15 and 15a, respectively. Selector switches 16 and 16a are provided, which switches may be operable by the brake operating mechanism, as shown in Fig. 5, or as an alternative may be operable by the wildcat locking heads 13 and 13a, as shown in Fig. 6. As long as at least one of the wildcats is engaged with the windlass shaft, or whenever one or both wildcats are free to turn, the selector switches will set the controller for wildcat or anchor chain operation. Fig. 5 shows such an arrangement for wildcat operation, in which situation the selector switches are in the open position.

Fig. 6 shows both locking dogs disengaged from the wildcats and both selector switches 16 and 16a closed, in which situation the gear 11 drives the gypsies 17 and 17a (sometimes called the niggerheads or capstan heads) directly.

In cases where the selector switches are mounted on the wildcat brakes, it is assumed that both of these brakes will be set during warping operation. In cases where the interlock switches are mounted on the wildcat locking device, both wildcats must be unlocked from the shaft when warping. In case of failure of closing of the selector switches, the controller will be set for wildcat operation, under which situation it will develop larger torques. More important than this, it will always provide a dynamic braking circuit in lowering.

In the event that the power fails while the master switch is in the "off" position, the magnetic brake will set and the self-generating dynamic braking circuit will be effective.

A detailed description of the sequential operation of the system for the various positions of the controller for both warping and windlass operation will now be given.

*Wildcat operation (hoisting)*

When the master switch MS is in the "off" position, master switch contacts MS8, MS9, MS10 are closed. The timing relays 1T, 2T, 3T are energized. In the first position, hoist master switch contacts MS1, MS3, MS4, MS5 and MS6 are also closed. Contactor 1M picks up—likewise, 2M, 3M, 5M and 1A. Field relay FR also picks up. Contactor 1DB also becomes energized. The circuit thus established is separately illustrated in Fig. 7. It may be traced from the positive line (+), going through contacts 1M1, the armature A, contacts 2DB1, the series field, resistance R5 R2, (i. e. the resistance included between points R5 and R2) contacts 1A1 and 5M1, the coil of the jamming relay coil JRW, contacts 3M1 to the negative (−) side of the line. An armature shunting circuit is completed through contacts 2M1 and resistor R8—R7. The shunt field "Sh. Fld." is connected by FR1 to the full line voltage, and the motor will operate with a compound characteristic in accordance with curve 1 of Fig. 3 (hoisting). On the second point (hoisting), contactor 2M is deenergized and contacts 2M1 open. This opens the parallel circuit 2M1 through the resistor portion between points R8—R7 (Figs 1 and 7) and the motor will operate in accordance with curve 2, Fig. 3, due to the increased voltage across the armature A. When the master switch is turned to the third position, contact member MS8 opens and deenergizes relay 1T. After a delay of about one second relay 1T trips energizing contactor 2A. The motor circuit now established is shown in Fig. 8. The series resistance has now been reduced to an amount R5—R3 due to the closure of contact 1A1, and the motor operates as shown on curve 3, Fig. 3. On the fourth point, master switch contact MS9 opens, deenergizing relay 2T which, in turn, after a delay, energizes contactor 3A. Contactor 3A reduces the series resistance to R5—R4 (Fig. 8) and Fig. 3 shows the operation (curve 4). On the fifth point, master switch contact MS10 opens and deenergizes relay 3T, and after another delay, relay 3T trips and energizes contactor 4A (Fig. 8). This cuts out all of the armature series resistance, and the motor now operates with full line voltage. In case the master switch handle were turned suddenly from the "off" position, the following circuit will first be established: From the positive side of the line contacts (Fig. 1) 1M1, the armature, contacts 2DB1, series field "Ser. Fld.," starting resistor R5—R2, contacts 1A1 and 5M1, jamming relay coil JRW, contacts 3M1 to the negative side of the line. After a delay of about one second, relay 1T will trip and energize contactor 2A, reducing the starting resistance to R5—R3. Relay 1T deenergizes relay 2T which will trip after another delay of about one second, energizing contactor 3A. Contactor 3A reduces the starting resistance to R5—R4. After a third delay of about one second, relay 3T will trip due to the opening of the contacts of relay 2T in its coil circuit and contactor 4A will be energized, thereby connecting the motor to full line voltage.

In case the current through jamming relay coil JRW reaches a certain value, say about 150% of full load current, relay JR trips contactors 2A, 3A and 4A. Another contact JR1 energizes relay 1T which, in turn, energizes relay 2T and this again energizes relay 3T, stepping up the circuit for a gradual cutting out of the starting resistor after the current has been reduced to normal value.

*Wildcat operation (lowering)*

On the first point of lowering contactors 2M, 3M, 4M, 5M, 1A, and 4A are closed. Contactor 1DB is energized. Relay FR also closes. The circuit through the motor, shown in Fig. 9, is as follows: From the positive side of the line through contacts 2M1, resistor R8—R7, contacts 2DB1, the armature, contacts 4M1, coil JRW, contactor 3M1 and to the negative side of the line. Starting at R7, a branch circuit goes through the series field, contacts 4A1, resistor $R_3$—$R_2$, contacts 1A1 and 5M1, and meets the armature circuit between contacts 4M1 and coil JRW. The shunt field winding is on full voltage. The series field winding in a certain way now acts as a shunt field and the motor operates with a shunt characteristic as per curve 1 of Fig. 3. The voltage on the armature is very small since it is connected directly parallel to the series field winding, and, therefore, the motor speed will be low. When the master switch handle is on points 2 or 3, contacts 1A1 (with no effect) and 4A1 are opened (Fig. 9) inserting into the series field branch circuit a resistance R5—R3. This will weaken the current in the series field winding and raise the armature voltage, thereby increasing the motor speed, as shown in curve 2—3 of Fig. 3. When the master switch handle is moved to points 4 and 5, relay FR is deenergized and opens contact FR1 thus inserting resistance J—F1 in the shunt field circuit (Fig. 10). Relay FR is operated by contact MS4. In the lowering direction the currents will never be so high as to operate relay JR since resistor R8—R7 is always in series with the motor.

*Warping operation*

The wildcats will both be unlocked from the shaft when the machinery is to be used for warping. Either the locking mechanisms or the brakes holding the wildcats in place will actuate the limit switches. When the contacts of both these limit switches are closed, a transfer relay CR will be energized and complete the whole setup for warping characteristics. Contactors 4M, 5M, relay FR, and contactor 1A will not operate for any warping operation.

For warping operation in the direction designated as hoist, and with the master switch in the first position, contactors 1M, 2M, 3M will close; contactor 1DB is energized. The circuit through the motor (Fig. 11) may be traced from the positive side of the line through contacts 1M1, the armature, 2DB1, series field resistor R5—R0, jamming relay coils JRD and JRW, contacts 3M1 and to the negative side of the line. A parallel circuit through contacts 2M1 and resistor R8—R7 by-passes the armature, the motor performing in accordance with curve 1 of Fig. 4. On the second point, contactor 2M will trip and open the branch circuit through resistor R8—R7 (Fig. 11). The motor will now act in accordance with curve 2 of Fig. 4. On the third point contactor 2A closes, cutting out starting resistances R3 to R1 but leaving in R5—R3 and R1—R0 (Fig. 11). The performance is now shown in curve 3 of Fig. 4. In the fourth point contactor 3A closes, further reducing the starting resistance to R5—R4 plus R1—R0 (Fig. 11), and curve 4 of Fig. 4 now applies. On the fifth point contactor 4A closes leaving only resistance R1—R0 in the circuit. This resistance step R1—R0 is in the armature circuit on all warping points. The jamming relay will now pick up on lower current than before, the ratio being determined by the turns of coils JRW and of JRD. By throwing the master switch handle suddenly from "off" position to the fifth point hoist position the same operation of the timing relays is obtained as for windlass operation.

The lowering direction of warping operation is similar to operation in the hoist direction except that contacts IMI will not close. Contacts 2DBI will open and contacts 6MI and 7MI will close. The circuit connections formed during the lowering warping operation are separately illustrated in Fig. 12.

*Dynamic braking circuit*

In case of loss of power during the lowering of the anchor an effective dynamic braking circuit is established through the armature, contacts 2DBI, the series field, dynamic braking resistor S2—R6, contacts IDBI and back to the armature. This braking circuit is separately shown in Fig. 13. The current in this circuit is self-generating and thereby prevents too high a lowering speed of the anchor when no power is available.

During all points of the warping operation resistance VI—FI is in series with the shunt field.

The essential feature of the invention is to combine for preselective operation the characteristics of a dynamic braking circuit with a symmetrical reversing circuit. By the use of the transfer relay we obtain a shift from the dynamic braking circuit to a symmetrical reversing circuit. The armature shunting circuit has been provided for both the dynamic braking operation and the straight reversing operation. I secure a variety of shunt fields by the use of the series resistors which are automatically inserted by the use of contactor interlocks 4MI or relay contacts FRI. Only part of the jamming relay winding is in the main circuit when using the equipment for anchor handling. For warping operation, all turns of the jamming relay winding are used, and at the same time include a series armature resistor R0—RI.

While the gypsies 17 and 17a have been described as suitable for warping operation, it will be readily obvious that such gypsies may be used for cargo hoisting or lowering, if desired, under special circumstances.

While selector switches 16 and 16a have been described as being automatically operable either by the wildcat locking head or by the brake operating mechanism, it will be readily apparent that such selector switches or selector switch may be manually operable, if so desired.

Thus, it will be seen that I have provided a system which for wildcat (hoisting) operation gives the motor a compound characteristic (a series characteristic could also have been used instead), and in the wildcat lowering operation gives the motor a strong shunt characteristic by virtue of reconnecting the series field so that it is largely independent of load; that is, by putting resistance in series with the series field winding and in connecting this in some manner in parallel with the armature so that no high speed will occur during overhauling. A dynamic braking feature is provided also.

For warping (hoisting or lowering), a compound (or if desired a series) characteristic is provided, and by suitable reversing of the current flow through the armature and by suitable arrangement of the contactors, identical characteristics are obtained for either hoisting or lowering, thereby facilitating control by the operator. Obviously, if different characteristics for hoisting were had from those of lowering, the operator would be confused and would lose control of the warping hawser, since it is difficult to accustom himself to two different operating characteristics.

I am aware that in some situations, as on smaller ships, operation of the gypsy in only one direction will be sufficient therefore eliminating the need of some of the contactors. On larger ships, however, it is desirable that the operator may chose the direction of winding he desires for the warping operation, so that, for example, he may have the rope always enter at the bottom of the gypsy, if desired.

I am, of course, aware that others, particularly after having had the benefit of the teachings of my invention, may devise other devices embodying my invention, and I, therefore, do not wish to be limited to the specific showings made in the drawings and the descriptive disclosure hereinbefore made, but wish to be limited only by the scope of the appended claims and such prior art that may be pertinent.

I claim as my invention:

1. In combination, a windlass comprising a drum for operating an anchor carrying chain, a drum for operating a load hauling rope by its winding action, a single reversible motor for driving said drums, selective coupling means for connecting said motor with either of said drums, circuit means operable to give said motor a speed-torque characteristic suitable for anchor chain driving operation and a different speed-torque characteristic for load hauling operation, and a selector switch for selectively operating said circuit means in dependence upon the selected setting of said coupling means to give said motor one of said speed torque characteristics corresponding to the drum to be driven and the operation performed thereby.

2. In combination, a windlass comprising a drum for operating an anchor carrying chain, a drum for operating a load hauling rope by its winding action, a single reversible motor for driving said drums, a drive shaft provided intermediate said motor and drums, a clutch for connecting and disconnecting one of said drums from said shaft, a brake for preventing movement of said one drum with respect to said shaft when disconnected therefrom by said shaft, circuit means operable to give said motor a speed-torque characteristic suitable for anchor chain driving operation and a different speed-torque characteristic for load hauling operation, and a selector switch for selectively operating said circuit means to give said motor one of said speed torque characteristics corresponding to the drum to be driven and the operation performed thereby, and means for actuating said selector switch mounted for operation by said brake.

3. A windlass for a ship comprising, in combination, a windlass drum for driving the anchor carrying chain and a hauling drum for hauling a load by its winding action, a driving motor, a selective transmission means for selectively coupling or uncoupling one of said drums with said motor, and electrical circuit means for said motor including a selector switch means which is selectively operable for varying said circuit means to give the motor a particular speed-torque characteristic with dynamic braking for chain driving operation and to give said motor a different speed-torque characteristic for its load hauling operation.

4. A windlass for a ship comprising, in combination, a windlass drum for driving the anchor carrying chain and a hauling drum for hauling a load by its winding action, a driving motor, selective transmission means for selectively coupling or uncoupling one of said drums with said motor, and electrical circuit means for said motor including a selective switch means which is selectively operable by said transmission means for varying said circuit means to give the motor a particular speed-torque characteristic with dynamic braking for its chain driving operation and to give said motor a different speed-torque characteristic for its load hauling operation.

5. A windlass for a ship comprising, in combination, a windlass drum for lifting or lowering an anchor carrying chain and a gypsy drum for warping operation, a driving motor, selective transmission means for selectively coupling or uncoupling said motor to one of said drums, and electrical circuit means for said motor having a selector switch means which is selectively operable for varying said circuit means to give the motor a relatively high torque characteristic with dynamic braking for its anchor operation and a relatively small torque characteristic for warping operation.

6. A windlass for a ship comprising, in combination, a windlass drum for lifting or lowering an anchor carrying chain and a gypsy drum for pulling the boat towards a fixed anchor on shore, a driving motor, mechanical selective transmission means for selectively coupling or uncoupling said motor to one of said drums, and electrical circuit means for said motor including a selector switch means which is selectively operable in dependence upon the selected setting of said transmission means for varying said circuit means to give the motor a relatively high torque characteristic with dynamic braking for its anchor operation and a relatively smaller torque characteristic for its boat pulling operation.

7. A control system for a windlass on a ship, including a driving motor, a windlass shaft driven thereby, a "wildcat" for driving in hoisting or lowering direction an anchor carrying chain, a "gypsy" for winding or unwinding a warping hawser, and means mounting said "gypsy" and "wildcat" for operation by said shaft, electrical circuit means for said motor having a master controller selector switch for selectively setting up different electrical circuits for said motor to give higher torque values for operation of said "wildcat" than for operation of said "gypsy," said circuit means including resistance means to form a dynamic braking circuit for said motor during lowering "wildcat" operation and reversing switch means to form an ordinary reversing circuit for said motor without provisions for dynamic braking during operation of said "gypsy."

8. A windlass for a ship comprising, in combination, a windlass drum for lifting or lowering an anchor carrying chain and a gypsy drum for warping operation, a driving motor, selective transmission means for selectively coupling or uncoupling said motor to one of said drums, and electrical circuit means for said motor having a selector switch means which is selectively operable for varying said circuit means to give the motor a relatively high torque characteristic with dynamic braking for its anchor operation and a relatively small torque characteristic for warping operation, said circuit means including reversing switch means and a dynamic braking resistor to form a reversible circuit which includes said resistor and said motor for dynamic braking during anchor lowering operation and a reversible circuit of substantially symmetrical speed-torque characteristics for said motor during warping operation.

9. Apparatus as set forth in claim 5 in which said motor is provided with a series field and a shunt field and said circuit means includes reversing switch means and is modified by said selector switch means to vary said fields and give, in the windlass drum operation, a compound motor characteristic for hoisting the anchor carrying chain and to give, by virtue of reconnection of said series field winding so as to make it substantially independent of load, a shunt motor characteristic for lowering the chain, and to give, in the warping operation, a reversible, compound motor characteristic for either direction of rotation of said gypsy drum.

10. A windlass for a ship comprising, in combination, a pair of drums, including a windlass drum for driving the anchor carrying chain and a hauling drum for hauling a load by its winding action, a driving motor, selective transmission means for selectively coupling or uncoupling one of said drums with said motor, and electrical circuit means including a dynamic braking resistor for said motor and a selector switch means which is operable for varying said circuit means to give the motor a dynamic braking characteristic for its chain driving operation and to give said motor a different speed-torque characteristic for its load hauling operation.

11. Apparatus as set forth in claim 3 in which said motor is provided with a series and shunt field, and in which said circuit means includes a controller having a plurality of positions for obtaining step-by-step motor speeds, said shunt field being weakened at at least the last controller position on the chain lowering operation.

KURT MAHNKE.